Sept. 30, 1969  B. Y. MOSS  3,470,376
TRACING HEAD FOR LINE FOLLOWING APPARATUS
Filed Nov. 16, 1966  6 Sheets-Sheet 1

Inventor
Brian Yoyall Moss

By
Watson, Cole, Grindle + Watson
Attorneys

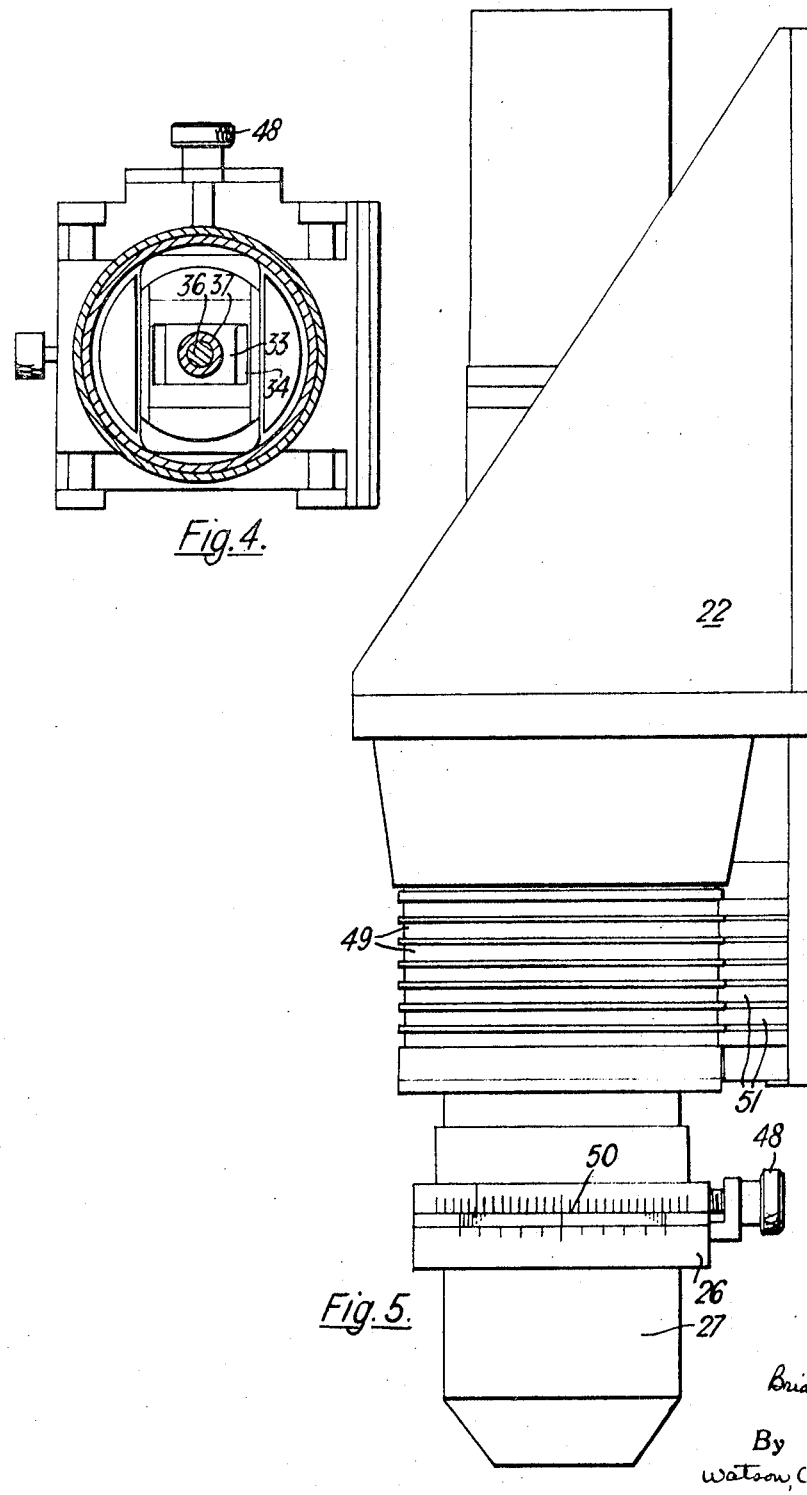

United States Patent Office 3,470,376
Patented Sept. 30, 1969

3,470,376
TRACING HEAD FOR LINE FOLLOWING
APPARATUS
Brian Yoxall Moss, 148 Norbury Court Road,
London SW. 16, England
Filed Nov. 16, 1966, Ser. No. 594,768
Int. Cl. G05b 1/04
U.S. Cl. 250—202                                    4 Claims

ABSTRACT OF THE DISCLOSURE

Apparatus for following a pattern of a type including a follower head having a rotatable member supporting a light-sensing device responding to the pattern and a driver for cyclically moving the follower head to provide constant amplitude movement thereof to produce modulated signals from the light-sensing device to control rotation of the rotatable member to cause the follower head to folow the pattern. A second light-sensing means may also be mounted to the rotatable member to provide an additional signal to slow down the driver in response to a change in direction of the sensed pattern.

---

The present invention relates to line- or curve-following apparatus of the light-responsive type and intended for directly or indirectly controlling the operation of a machine performing an operation upon a workpiece by a cutter or similar means dependently upon a drawing, template or the like representing the shape of a component to be produced.

Such line-following devices have been proposed for various purposes heretofore but the constructions previously adopted are subject to certain disadvantages as regards accuracy and ability to control a machine tool, and the object of the present invention is to provide an improved form of device of the character referred to which is quick and accurate in response and is arranged so as to follow the centre of a marked line rather than the edge of a marked line to be followed, and which can be readily adapted to allow for the known dimensions of a cutting or other manipuating tool involved to ensure that the machined outline is an exact reproduction of the drawing or pattern being followed.

The features of the present invention are applicable to a wide variety of machining operations based for example on chip removal machining processes, such as routing or milling, and it may also be used for channelling operations, while the features of the present invention are equally applicable to flame cutting.

An important feature of the present invention, which is moreover applicable independently of the construction and operational features of the follower head described herein, is that the relevant data derived from a drawing or template is adapted to be recorded on some form of recoding medium, for example a magnetic tape, so that such tape can be used for the control of the machining operation whenever required and in some cases of a machine tool located at a different point.

The present invention covers both the direct operative linkage of a line-following device of the character referred to with a machine tool capable of cutting or otherwise machining a workpiece, as well as the provision of recording means responsive to the movement of the line-follower head as it follows the outline of a drawing or template, to produce a record for example on magnetic tape, which may be utilized on a separate or remote machine for performing the machining operations at a later date.

A line-following device according to the invention comprises a follower head assembly including at least one light source energised at predetermined alternating current frequency and adapted to illuminate the surface of a drawing or template recording a pattern to be reproduced and a light sensitive device responsive to reflection from the surface of the drawing or template and reciprocated at a harmonically related frequency to produce an alternating current signal having a variable phase component which is capable of operating a servo motor to adjust the rotary position of the head and the direction of the reciprocatory motion in such sense that the said reciprocatory motion maintains a constant relationship to the drawing line or the template to be followed, and said head is adapted to be moved physically in two directions in space dependently on said rotary position so that the head moves progressively over the said surface, traversing the said line or template.

The rotary position of the head is thus co-ordinated with a translatory movement of the head so that the latter accurately follows the line or template being reproduced and this translatory movement is conveniently obtained by means of an X- and Y-axis driving motor suitably coupled to carriage members supporting the head. Operation of the X- and Y-axes driving motors is conveniently derived from a resolver coupled to the head and adapted to produce co-ordinate driving signals for operating the X- and Y-axes motors through suitable amplifier circuits.

Conveniently two independent light-sensitive devices are provided reciprocated together relatively to the line or outline being followed and one of said devices functions as a forward seeking device capable of sensing any change in direction of the line or outline and adapted to produce a slow-dow signal which retards the X- and Y-axes driving motors if a sudden change in direction of the line or outline is detected.

In one construction according to the invention the movement of the head is directly coupled to an adjacently positioned machine tool of suitable type so as to perform a cutting operation identical with the drawing line being followed; while in an alternative embodiment of the invention the X- and Y-axis signals are converted into data form suitable for recording on a recording medium, for example to produce pulse signals, which are recorded on one or more magnetic tapes. This tape or these tapes can thereafter be used for controlling a separately positioned machine tool.

The features of one embodiment of the present invention are illustrated by way of example on the accompanying drawings in which:

FIG. 4 is a section on the line III—III of FIG. 3,

FIG. 5 is a side elevation of FIG. 3 as seen in a direction at right angles to FIG. 3.

Figure 2:
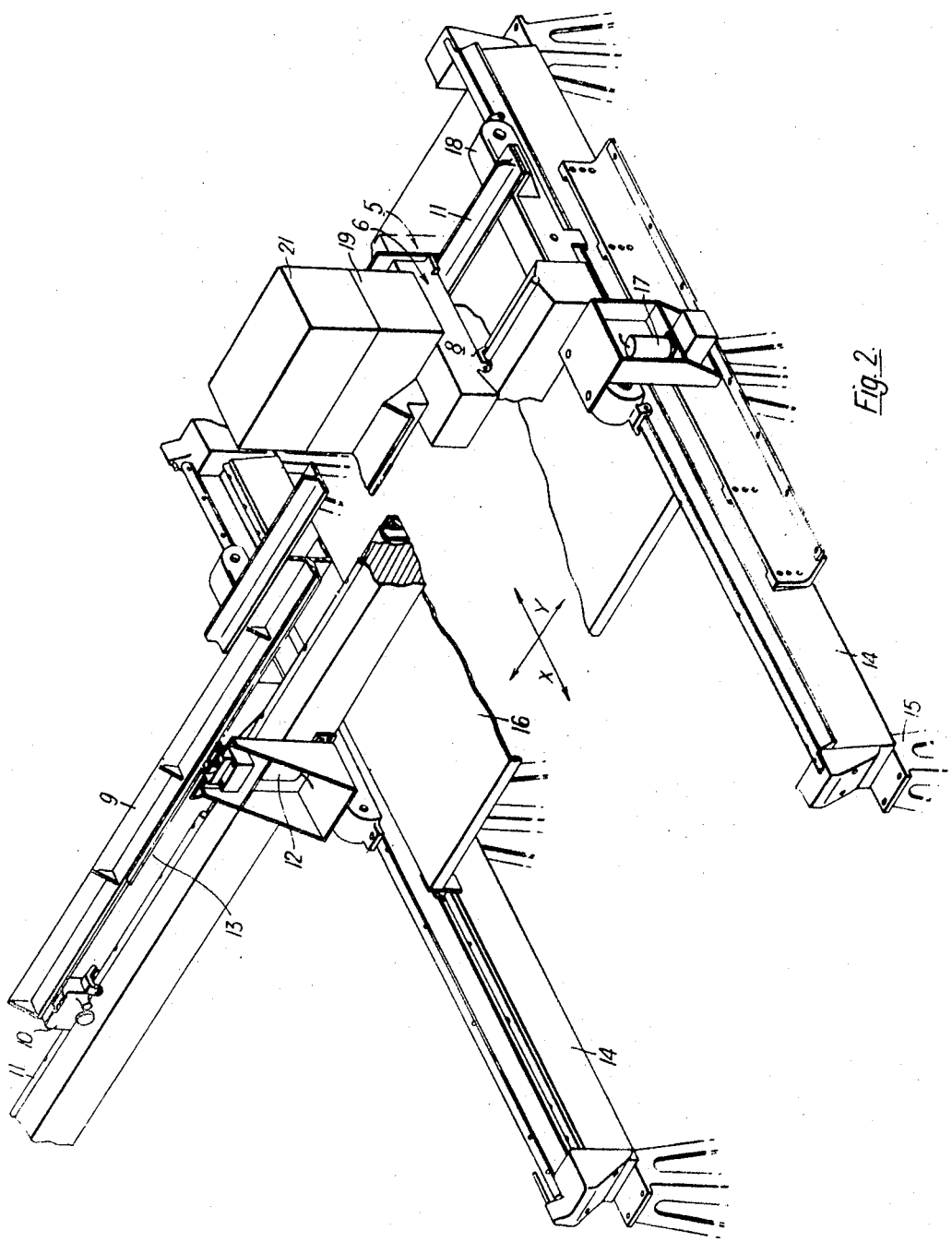
FIG. 2 is a general view showing the carriage mounting permitting movement along the X- and Y-axis.
Figure 3:
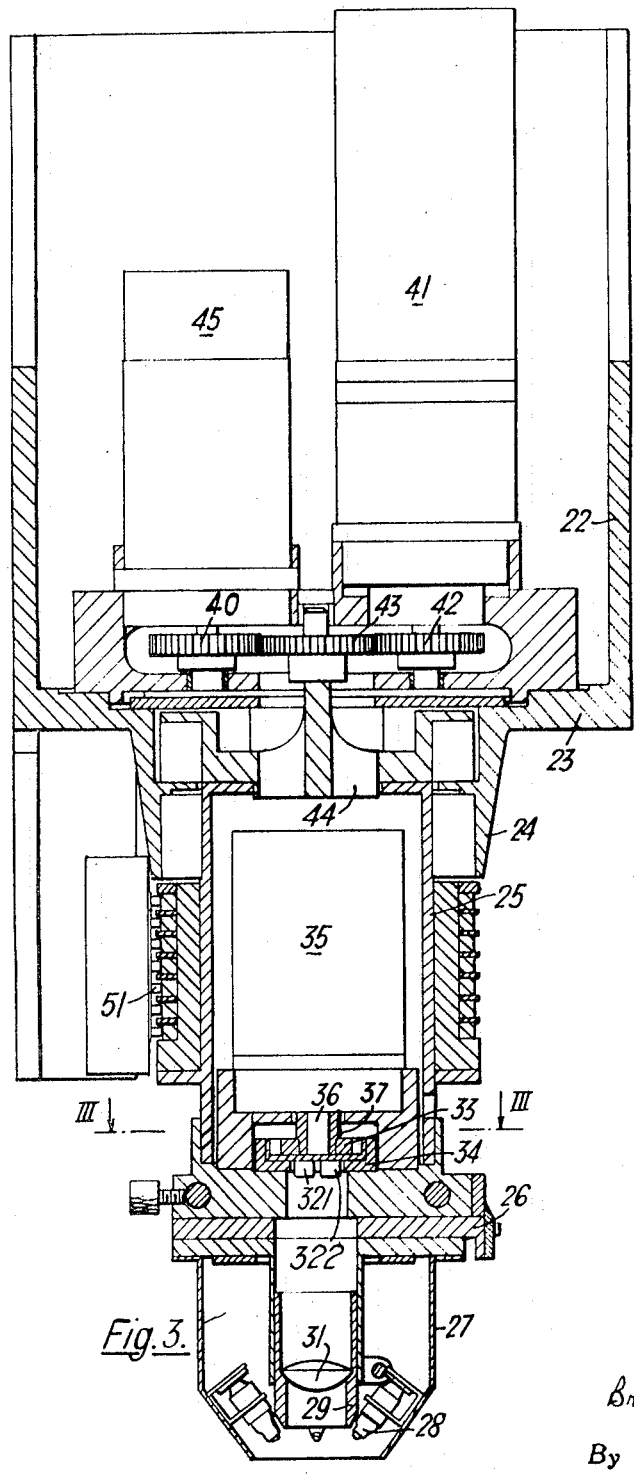
FIG. 3 is a central section showing the follower head.

Referring first to FIG. 2 of the drawings, the follower head shown in detail on FIGS. 3 to 5 of the drawings and indicated generally at 5 is supported on a carriage 6 for movement in two directions along the X- and Y-axes above a table 16 to receive a drawing or similar original to be reproduced. As shown the carriage 6 is supported by a runner 8 and includes a projecting arm 9 carrying a further runner 10. The runners 8 and 10 are supported on parallel rails 11 and are movable lengthwise on said rails in a direction which represents the Y-axis of a co-ordinate system by means of a Y-axis drive motor 12 in driving engagement with a rack 13 fixed to the arm 9.

The parallel rails 11 also form the X-axis main carriage and run on parallel support rails 14 suitably supported on fixed carriers 15 with the table surface 16 located between them to carry a template or drawing to be followed by the line follower head 5.

An X-axis driving motor 17 co-operates with a suitable rack, not shown, associated with a carriage member 18 running on one of the rails 14 and serving as supports for the ends of the rails 11.

Box-like housings are shown at 19 and 21 for housing a control unit and the associated power amplifiers required for regulating the operation of the X- and Y-axis driving motors 17 and 12. Thus it will be seen that the follower head 5 is supported by a carriage movable on X- and Y-axes guide rails for universal movement in a plane parallel to the plane of a drawing or template to be followed. The movements in the two directions are obtained from servo-motors 12, 17 each with tachometer generator feedback speed control, the control signals for the servo systems being taken from amplifiers operated from a resolver hereinafter referred to.

Figure 1:
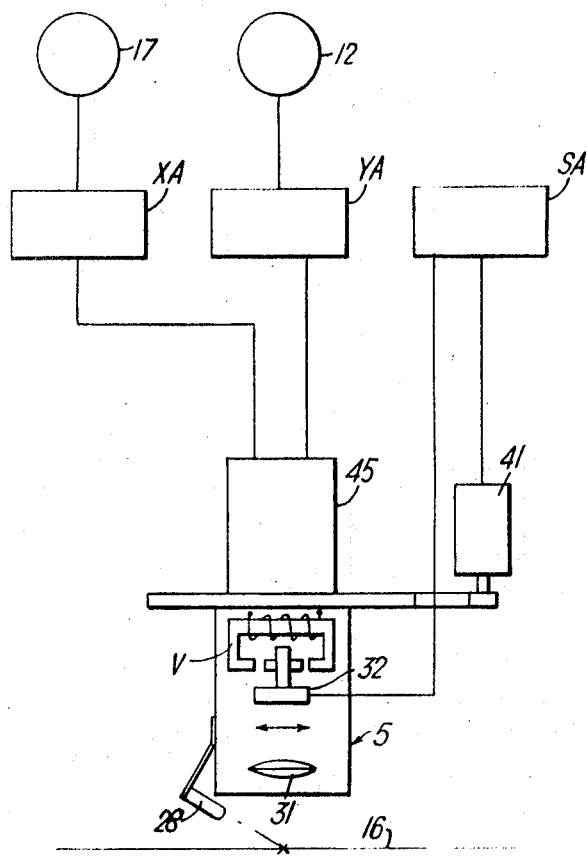
FIG. 1 is a block circuit diagram illustrating the main features of the invention.

FIG. 1 is a block diagram illustrating the operating principles of the present invention. It will be seen that the follower head 5 carries one or more light sources 28 adapted to illuminate a drawing placed on the table surface 16 and a lens 31 forms a magnified image of the line or surface being followed in a plane containing a light-dependent resistor 32 which is vibrated in a direction transversely to the line image by means of vibrator unit V which in one practical embodiment of the invention shown in FIG. 3 of the drawings consists of a synchronous motor 35 and an eccentric driving crank 36.

The follower head 5 is rotatable about a vertical axis and by means to be explained the head 5 is always "steered" to follow the configuration of a template or workpiece while movement is imparted to the follower head 5 along the X- and Y-axes by the action of the driving motors 12 and 17. The light-dependent resistor 32 is connected to a servo amplifier SA which drives a servo-motor 41 geared to a carrier for the follower head 5 to impart the required rotary steering movements to the latter according to the response of the light-dependent resistor 32.

The follower head is also connected to the shaft of a resolver 45 which controls the output of X and Y signals dependent on the rotary position of the follower head 5. These signals are applied to the X- and Y-axis amplifiers XA and YA which in turn control the operation of the X- and Y-driving motors 17 and 12, as explained below with reference to FIGS. 6 and 8.

The servo-motor 41 is operated so that the follower head 5 is always placed with the vibratory movement of the light-dependent resistor 32 transverse to the line being followed, and if the line changes direction the rotary positioning of the follower head is varied by the servo-motor 41 as explained below. This rotary movement of the follower head 5 modifies the two outputs from the resolver 45 to regulate the relative speeds and directions of operation of the X and Y drive motors. The resulting translatory movement of the follower head 5 is such as to cause it to follow the drawing line.

Referring now to the follower head shown in detail on FIGS. 3 to 5, it will be seen that this embodies a bracket 22 adapted to be bolted to the carriage 6 and having a horizontal flange 23 with a downwardly depending sleeve part or casing 24 providing a rotary mounting for a support tube 25 about a vertical axis directed towards the drawing or template surface 16 to be followed. The support tube 25 carries a cross slide 26 at its lower end which receives a casing 27 housing a plurality of light sources 28, four being conveniently provided, adapted to direct light on to the drawing surface bearing the line or other marking to be followed. These light sources 28 are distributed around a central tube 29 within the casing 27 the said tube housing an optical system 31 adapted to produce a magnified image of the line or template to be followed upon the light-dependent resistor 321 placed in the lower part of the support tube 25.

Conveniently two such light-dependent resistors 321, 322 are provided, the resistor 322 sensing a sudden change in direction of the drawing line to provide a slow-down signal. Each resistor has a cover provided with a narrow slit-like aperture, the two apertures being in line one with the other, and said resistors are supported by a reciprocable carrier 33 supported on linear guides 34 at the base of the support tube for movement transverse to the slit-like apertures in the photo-resistors 321, 322.

Figure 6:
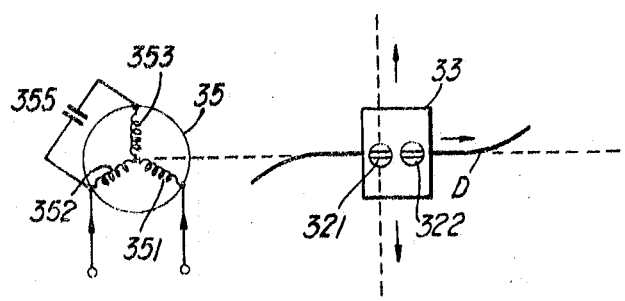
FIG. 6 is an explanatory view showing two light-responsive devices following a line on a drawing.

The part of the support tube 25 lying above the carrier for the light-depedent resistors houses a synchronous motor 35 of the self-phasing type to ensure alignment of the servo systems, (see also FIG. 6). The motor shaft 36 includes an eccentric driving pin 37 engaged in a slot in the carrier 33 so that the resistors are reciprocated linearly by the synchronous motor at a rate which is harmonically related to the illumination of the surface to be followed by the light sources and with an amplitude which exceeds the width of the magnified line image produced by the optical system 31 on the resistors 321, 322.

This is illustrated on FIG. 6 of the drawings where the image of a drawing line D is scanned by reciprocatory movement of the light dependent resistors 321 and 322 so that the forward-looking resistor 322 on the drawings, is capable of sensing a change in direction of the line D to slow down the drive when this condition is found. FIG. 6 also illustrates the synchronous self-phasing motor 35 which includes windings 351, 352 and 353, the latter two windings shunted by a capacitor 354 to provide the self-phasing effect in well-known manner.

Figure 7:
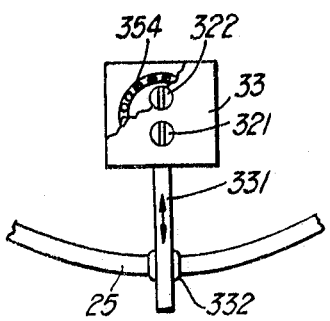
FIG. 7 is a diagramamtic view illustrating another method of imparting a reciprocatory movement to the light-responsive device.

An alternative method of constructing the holder 33 for the resistors 321 and 322 is illustrated on FIG. 7 of the drawings where the holder 33 is associated with an arm 331 slidably carrying a part-spherical bushing 332 accommodated in an aperture in the wall of the casing 25. The motor 35 is connected to an eccentric 354 accommodated by means of a ball bearing within a circular recess in the upper face of the holder 33. With this arrangement the resistors 321, 322 execute a substantially circular movement which provides the required components of movement transverse to the drawing line D, in the same way as illustrated in FIG. 6.

In general the two resistors 321 and 322 are reciprocated backwards and forwards side-by-side across the magnified image of the drawing line D projected by the lens 31 on to the resistors and as already indicated one of the resistors 322 in FIG. 6, is a forward-looking resistor having the purpose of sensing a change in direction of the line D. Conveniently the outputs from the two resistors are combined in such a way that a small proportion of the signal derived from the forward-looking resistor is integrated with what may be regarded as the main signal from the other resistor. An output signal can also be derived from the forward looking resistor which serves as a slow-down control to reduce the overall speed of the translatory movement of the follower head if the error signal is large due to a sudden change in direction, i.e. an angular corner, in the line or template.

Figure 8:
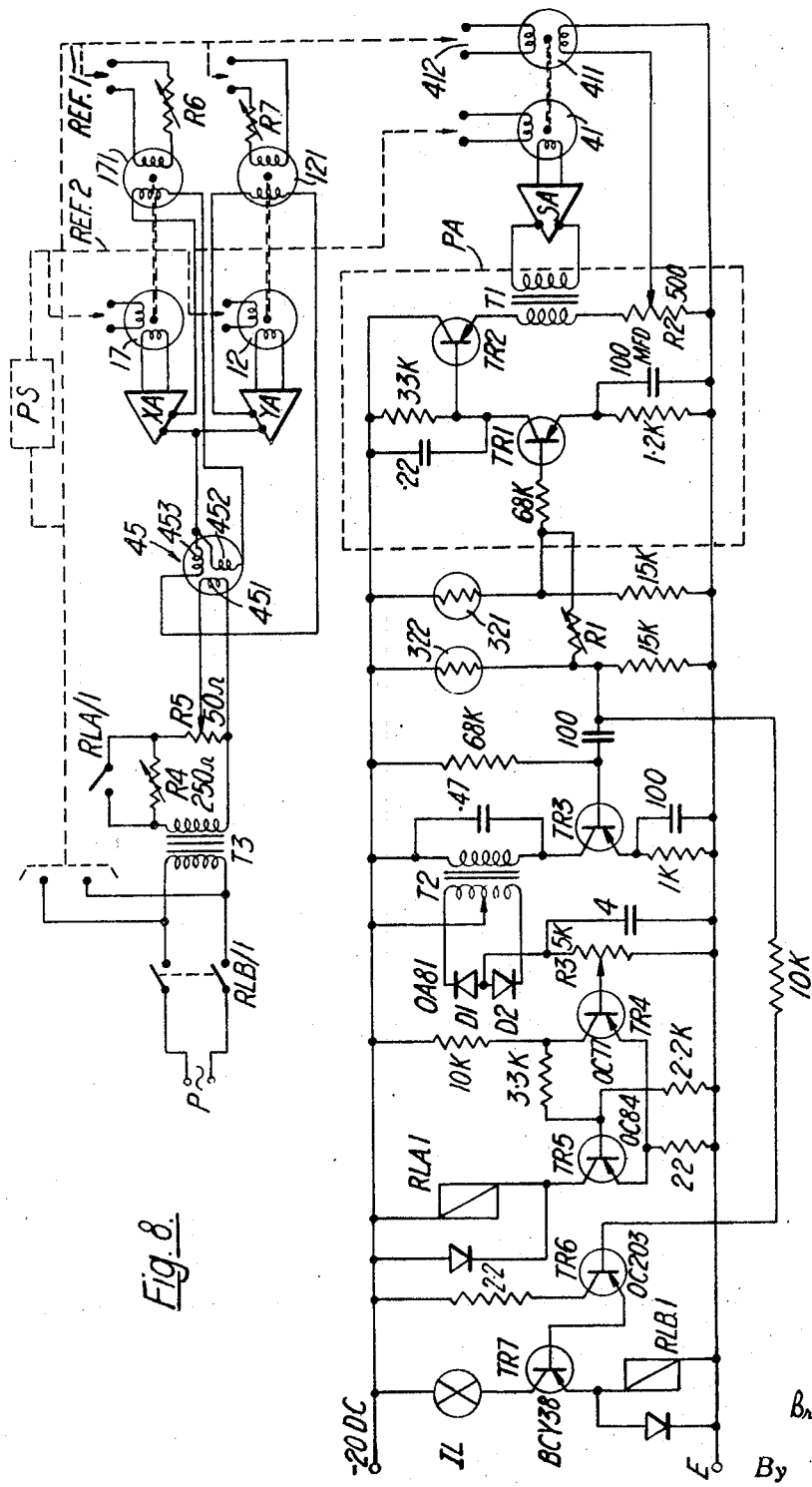
FIG. 8 is a circuit diagram illustrating the operation of the present invention.

The light sources 28 may for example be energized at line frequency and the light received by the light-sensitive resistors 321 and 322 accordingly varies periodically at twice line frequency and there is a superimposde periodic variation at the rate of reciprocation of the light-sensitive resistors 321 and 322 which is the phase of the superimposed periodic variation changes with change in direction of the line being followed and provides a composite signal of twice line frequency which is applied to the amplifier SA in FIGS. 1 and 8 which is a transistor type limiter amplifier.

If the conditions arising when the follower head is moving along a line or curve to be followed are considered, it will be seen that the alternating voltage apperaing at the terminals of the amplifier will be a varying phase signal; the phase depending on the position of the magnified image of the line relatively to the translation movement of the head 5 of the light dependent resistors 321 and 322. Curvature of the line results in a change of position of the line relative to the former path of the head 5. The result is to change the phase relationship of the waveform in a manner which represents in sense and magnitude the deviation of the line from the former path being followed by the follower head 5.

The output from a limiter amplifier forming part of the servo amplifier SA is connected to a winding or windings of a servo-motor 41 while another winding is a reference winding energised at line frequency, as explained below with reference to FIG. 8. The servomotor 41 drives a spur gear 42 which engages a spur gear 43 fixed to an end cover 44 of the support tube 25. The motor 41 is operated so that the support tube is rotated to maintain a constant position of the head 5 with the reciprocatory movement of the resistors 321 and 322 transverse to the line or template being followed, and at the same time the X- and Y-axis driving motors are actuated, as explained hereinafter so that the follower head 5 receives a translatory movement so as to follow precisely the configuration of the line or template being followed.

The spur gear 43 also meshes with a spur gear 40 carried by the shaft of a resolver 45 of well-known type which produces X- and Y-axes co-ordinate signals varying according to the rotary positioning of the follower head 5 and the tube 25 and regulates the operation of the X- and Y-axis driving motors as hereinafter explained.

If due to a sudden change in direction of the line there is a substantial error signal, the forward-looking resistor 322 may be arranged to produce a slow-down signal, as explained below with reference to FIG. 8 which acts upon the servo-motors 17 and 12 so as to reduce the speed of operation, thereby enabling the follower head to follow the line accurately despite the sudden change in direction thereof.

The control features will now be explained in greater detail with reference to the circuit diagram of FIG. 8, showing the essential circuit features in a diagrammatic form and in a way which will be understood by those versed in electronic circuitry. Only the essential characteristics of the circuit will be referred to hereinafter since anyone skilled in the art will understand the purpose of the various circuit components such as resistors, capacitors and so on which represent the components commonly utilized in such circuits. Appropriate values have been indicated beside most of the components but it will be understood by those versed in the electronic arts that these values may have to be changed in accordance with well-known principles if for example different transistor types than those indicated are adopted. Similarly it has not been thought necessary to show the details of the X- and Y-axis amplifiers indicated at XA and YA, or the details of the servo amplifier SA since these amplifiers are based on conventional practice in the servo control system art.

Referring now to the specific novel features of the circuit shown in FIG. 8, it will be seen that the light dependent resistors 321, 322 are connected to the input of a pre-amplifier indicated by the dotted framework PA comprising two transistors TR1, TR2. It will be observed that the primary resistor 321 is connected directly to the base of the transistor TR1 and that a proportion of the input from the forward-looking light-dependent resistor 322 is also applied to the base of the transistor TR1, the amount so introduced being controlled by the variable resistor R1.

The output from the pre-amplifier PA is taken from a transformer T1 in the emitter circuit of the transistor TR2 and fed therefrom to the servo amplifier SA operating the servo motor 41 for imparting steering movements, as already explained, to the rotatable head assembly comprising the casing 25 and parts associated therewith. The servo motor 41 receives a quadrature reference voltage from a quadrature reference line REF 2 and is associated with a built-in tachometer generator 411 which provides a feed back signal dependent on the speed of the motor 41 to a potentiometer resistor R2 in the emitter circuit of the transistor TR2, thereby providing feedback to the amplifier SA. The tachometer generator 411 receives a reference voltage signal at terminals 412 from a line energized reference supply, as indicated by the dotted line marked REF 1.

The output from the forward-looking light-dependent resistor 322 is also arranged to provide a slow-down signal. For this purpose there is a connection from the light-dependent resistor 322 to the base of a transistor TR3 the collector line of which includes a transformer T2 having a secondary winding shunted by diodes D1, D2 connected back-to-back, the common point being fed through an adjusting resistor R3 to a transistor trigger circuit comprising transistors TR4 and TR5, the collector load of the latter transistor being provided by a relay coil RLA1, the functioning of which is referred to below.

The forward-looking light dependent resistor 322 is also adapted to control a lamp failure circuit to put the apparatus out of operation in the event of lamp failure. For this purpose the light-dependent resistor 322 is also connected to the base of a transistor TR6 being part of an amplifier circuit comprising the transistors TR6 and TR7. The emitter circuit of the transistor TR7 includes a relay RLB1 and the collector circuit includes an indicator lamp IL. In the event of lamp failure, the transistors TR6 and TR7 cause release of the relay RLB1 the contacts RLB/1 of which cut off the power supply to the X and Y servo motors 17 and 12.

A line power input P is connected through the contacts RLB/1 to a transformer T3 and also feeds the reference lines REF 1 and REF 2, the latter through a phase shifter PS, all as indicated in dotted lines.

The secondary of the transformer T3 includes a variable slow speed control resistor R4 shunted by a contact RLA/1 operated by the relay RLA1 which shunts the resistor R4 during normal operation, but which contact is opened when the transistors TR4 and TR5 release the relay RLA1 when the forward-looking light-dependent resistor 322 senses a sudden change in direction in the line D. The transformer T3 feeds a potentiometer resistor R5 which serves as an overall speed control, by providing a variable voltage supply input to the resolver 45. The latter, which is of well-known construction, includes a first winding 451 energized by the potentiometer resistor R5 and two quadrature output windings 452, 453 connected respectively to the X amplifier XA and the Y amplifier YA. These amplifiers drive the X- and Y-driving motors 17, 12 respectively, each of which is operatively connected with a tachometer generator 171, 121 respectively. Each of the latter generators receives a reference voltage from the reference line indicated at REF 1.

Variable resistors R6, R7 in the reference winding circuits permit the speed of the X- and Y-motors to be appropriately equalised during setting up the equipment. It will be observed that the feed from the resolver winding 452 to the X amplifier XA is through the main winding of the tachometer generator 171 and likewise the feed from the resolver winding 453 to the Y amplifier YA is through the main winding of the tachometer generator 121.

The X- and Y-motors 12 and 17 receive a quadrature reference voltage from the quadrature reference feed line REF 2.

In operation the two resistors 321, 322 are in continuous reciprocatory movement and the head 5 is placed over the drawing to be followed, the reciprocatory movement of the resistors being transverse to the magnified image of the drawing line, and the head 5 is in continuous bodily movement while following at predetermined speed the drawing line D under the action of the co-ordinate driving motors 12 and 17. The reciprocatory motion coupled with the alternating current energization of the light sources 28 results in the production of a composite phase varying signal which is amplified by the pre-amplifier PA. The varying phase signal applied to the limiting amplifier SA produces a driving torque at the motor 41 which rotates or "steers" the head 5 in such direction and to scuh degree as to maintain the reciprocating motion of the light-dependent resistors 321 and 322 at right angles to the drawing line D. Hence when a change in direction in the drawing line is detected the phase relationships are changed and the motor 41 rotates the head 2 in one direction or the other until the movement of the resistors 321, 322 is transverse to the drawing line D. This position is maintained throughout the movement of the head 5 along the drawing line being followed.

The controlled rotation of the head 5 actuates the moving element of the resolver 45 and the X- and Y-driving motors 12, 17 are therefore rotated at different speeds and in one direction or the other according to the angular positioning of the head 5 which thus remains centralized over the drawing line being followed. Hence the head 5 follows the drawing line, the head rotating as necessary and moving progressively directly along the drawing line D.

As stated the head 5 may be directly linked to a metal cutting tool or the co-ordinate movements of the head 5 may be recorded on any suitable recording medium, for example magnetic tape, and the tape record used on a separate machine for controlling the co-ordinate movements of the cutting tool.

Means are preferably provided for horizontal adjustment of the cross slide 26 carrying the optical sytem and the light sources so that the follower head 5 as a whole can be offset to the axis by an amount corresponding to the dimensions of a cutter tool which is to be used in conjunction with the followered equipment. Accordingly, the said bottom section of the support tube embodies a screw adjustment 48 and a scale and vernier 50 to permit the casing housing the light sources and the optical system to be accurately offset by an amount corresponding to the said tool radius. This ensures that the cutting operation is carried out in such a way that the cut outline is precisely identical to the drawing or pattern being followed.

An important advantage of the arrangement adopted according to the present invention is that the servo-motor 41 is maintained under full energization and is thus capable of rapidly and accurately following the position of the line being followed and moves only in response to a phase change in the input signal.

The support tube 25 must be capable of free rotation within the follower head 5 to enable it to follow a line on a drawing or the edge of a template or the like and accordingly the support tube 25 is provided with a plurality of slip rings 49 at its periphery engaged by suitable brushes 51 on the main casing 22 to provide appropriate connections to the light sources 28 and to the light dependent resistors 32 and also to provide the driving current for the synchronous motor 35.

As already indicated, the response of the follower head 5 when caused to follow an outline or template may be used to porduce pulse signals which may be recorded on one or more magnetic tapes, and conveniently these records are in the form of cratesian co-ordinates such as are obtained from the resolver. Preferably, however, the shafts of the X- and Y-drive motors carry impulsing wheels adapted to produce digital signals, for example by photo-electric scanning methods, and these signals are recorded on magnetic tape which can thereafter be used for actuating or controlling the X- and Y-motors on a separately located machine tool of the appropriate type.

What I claim is:

1. An outline following apparatus wherein a follower head is mounted over a surface bearing an outline to be traced and including a rotatable member supporting a light-sensitive device responding to said outline, cyclically movable means for producing modulated signals from said light-sensitive device to control the rotation of said member in accordance with the position of said outline relative to the cyclic movement of said member, the signals causing said follower head to continuously follow the outline, means for displacing said follower head in accordance with the controlled rotation of said member, optical means in said rotatable member for projecting an image of said outline directly onto said light-sensitive device, means responsive to the modulated signal output from said light-sensitive device for controlling the rotation of said member and for actuating the means for displacing the follower head to follow the outline, the improvement essentially consisting of means for driving said cyclically movable means to produce a constant cyclic amplitude movement thereof and to provide a controlled transverse movement of said light-sensitive device to said projected outline image.

2. An outline following device according to claim 1 wherein said follower head further includes a tubular casing having a rotatable tubular member, said rotatable member including a reciprocal mount for carrying said light-sensitive device, and wherein said drive means includes linear guides for guiding the reciprocatiaon of said mount and said light-sensitive device transversely to the axis of the rotatable tubular member, said means for driving further including a synchronous electric driving motor which is supported within said tubular member, said motor including a motor shaft, said motor shaft including an eccentric pin which engages a reciprocal member mounted on said mount transversely to said linear guides for transmitting reciprocating motion to said mount from said eccentric pin.

3. An outline following device according to claim 1 further comprising a laterally displaceable member at the end of the rotatable member nearest to the outline to be followed, an optical system carried by said laterally displaceable member, and calibrating means for varying the adjustment position of said laterally displaceable member for displacing the optical axis relative to the axis of the follower head of the rotatable member therein for varying the offset position of the follower head relative to the outline being followed.

4. An outline following device according to claim 1 further comprising an additional independently operated light-sensitive device on said mount, said light-sensitive device receiving reflections of the outline image in advance of the aforesaid light-sensitive device, and means operated by the additional light-sensitive device for controlling the operating speed of the means effecting displacement of the follower head around the outline in response to a sensing of a change in direction of the outline by said additional light-sensitive device.

References Cited
UNITED STATES PATENTS

| | | | |
|---|---|---|---|
| 2,933,612 | 4/1960 | Cheverton | 250—202 |
| 2,988,643 | 6/1961 | Inaba | 250—202 |
| 3,037,888 | 6/1962 | Lobosco | 250—202 X |
| 3,213,282 | 10/1965 | Brouwer | 250—202 |

JAMES W. LAWRENCE, Primary Examiner

C. R. CAMPBELL, Assistant Examiner

U.S. Cl. X.R.

250—208, 209; 266—23